United States Patent [19]
Gentry et al.

[11] Patent Number: 5,875,352
[45] Date of Patent: Feb. 23, 1999

[54] METHOD AND APPARATUS FOR MULTIPLE CHANNEL DIRECT MEMORY ACCESS CONTROL

[75] Inventors: Denton E. Gentry, Palo Alto; Rasoul M. Oskouy, Fremont, both of Calif.

[73] Assignee: Sun Microsystems, Inc., Mountain View, Calif.

[21] Appl. No.: 553,041

[22] Filed: Nov. 3, 1995

[51] Int. Cl.$^6$ .................................................. G06F 13/28
[52] U.S. Cl. ......................... 395/843; 395/842; 711/136
[58] Field of Search .................................. 395/463, 487, 395/842, 444, 843, 845, 846, 851, 858

[56] References Cited

U.S. PATENT DOCUMENTS 4,126,893  11/1978  Cronshaw et al. .
5,606,688   2/1997  McNutt et al. ..................... 395/497.01

FOREIGN PATENT DOCUMENTS

| 0086886 | of 0000 | European Pat. Off. . |
|---|---|---|
| a306702 | 3/1989 | European Pat. Off. . |
| A486145 | 5/1992 | European Pat. Off. . |
| A549924 | 7/1993 | European Pat. Off. . |
| 2816838 | of 0000 | Germany . |
| 1234038 | of 0000 | United Kingdom . |
| WOA9323810 | 11/1993 | WIPO . |

Primary Examiner—Tod R. Swann
Assistant Examiner—J. Peikari
Attorney, Agent, or Firm—Blakely Sokoloff Taylor & Zafman

[57] ABSTRACT

An on-chip cache memory is used to provide a high speed access mechanism to frequently used channel state information for operation of a DMA device that supports multiple virtual channels in a high speed network interface. When an access to a particular channel state is performed, e.g., by a host processor or the DMA device, the cache is first accessed and if the state information is not located currently in the cache, external memory is read and the state information is written to the cache. As the cache does not store all the states stored in external memory, replacement algorithms are utilize to determine which channel state information to remove from the cache in order to provide room to store a recently accessed channel. A doubly linked list is used to track the most recently used channel. As cached channel information is accessed, the corresponding entry is moved to the top of the list. The doubly linked list provides a rapid apparatus and method for updating pointers to the cache. Top and bottom pointers are maintained, pointing to the most recently used and least recently used channels. When a channel is used, it moved to the top of the list. When channel data is moved from external memory to the cache, the bottom pointer points to the channel data to be removed from the cache.

20 Claims, 9 Drawing Sheets

METHOD AND APPARATUS FOR MULTIPLE CHANNEL DIRECT MEMORY ACCESS CONTROL

BACKGROUND OF THE INVENTION

1. Field of the Invention

The present invention relates to providing a multichannel direct memory access (DMA) engine to support transfer of data across multiple channels in a multi-channel high speed network.

2. Art Background

Certain applications dictate the need for multiple DMA mechanisms. One technique is to provide multiple sets of DMA hardware to support the multiple devices that are performing DMA transfers. Another technique is to provide one set of DMA hardware that is configurable to support DMA transfers between a plurality of devices and memory. However, configuration or state information for each device must be maintained for rapid access by the DMA hardware. For speed purposes, it is desirable to maintain all the state information in memory located on the same component as the DMA hardware. If kept in on-chip memory, however, the cost can be significant if a large number of devices are supported.

SUMMARY

The method and apparatus of the present invention enables the virtual support of a large number of devices without the requiring a large amount of memory to store the state information for each supported device. In the present embodiment, the DMA mechanism enables the support of 1024 communication channels for transfer of data received on a high speed network, such as an asynchronous transfer mode (ATM) network to the host computer system memory.

In one embodiment, data received from the network across a plurality of high speed channels is transferred to the host computer system memory through DMA transfers performed by a single DMA engine. The system is configured to maintain state information for each possible channel. The DMA engine performs transfers in accordance with the state information provided for a particular channel. The aggregate amount of state information is large and is prohibitively expensive if kept in on-chip memory. Furthermore, it is highly unlikely that all channels supported by the DMA engine will be simultaneously active. Therefore channel state information is maintained in an external memory.

An on-chip cache memory is used to provide a high speed access mechanism to state information for frequently used channels. In the present embodiment, the cache maintains information for 128 connections. Therefore, up to 128 DMA states for 128 channels are maintained by the cache. The cache memory is smaller and provides a faster access than the external memory. When an access to channel state is performed, e.g., by the host processor or the DMA engine, the cache is first accessed and if the state information is not located currently in the cache, external memory is read and the state information is written to the cache. As the cache does not store the states for all the channels, high speed algorithms are utilize to continually update entries to identify the most recently used entry and to determine which entry of channel state information to remove from the cache in order to provide room to store a recently accessed channel.

BRIEF DESCRIPTION OF THE DRAWINGS

The objects, features and advantages of the present invention will be apparent from the following detailed description in which.

DETAILED DESCRIPTION

The system and method of the present invention provides a channel cache to virtually support a large number of channels for the transfer of data to/from a network. The present invention will be described in the context of a asynchronous transfer mode (ATM) interface card for the transfer of data across an ATM network. However, the present invention is not limited as such, and can be utilized in similar environments.

Figure 1:
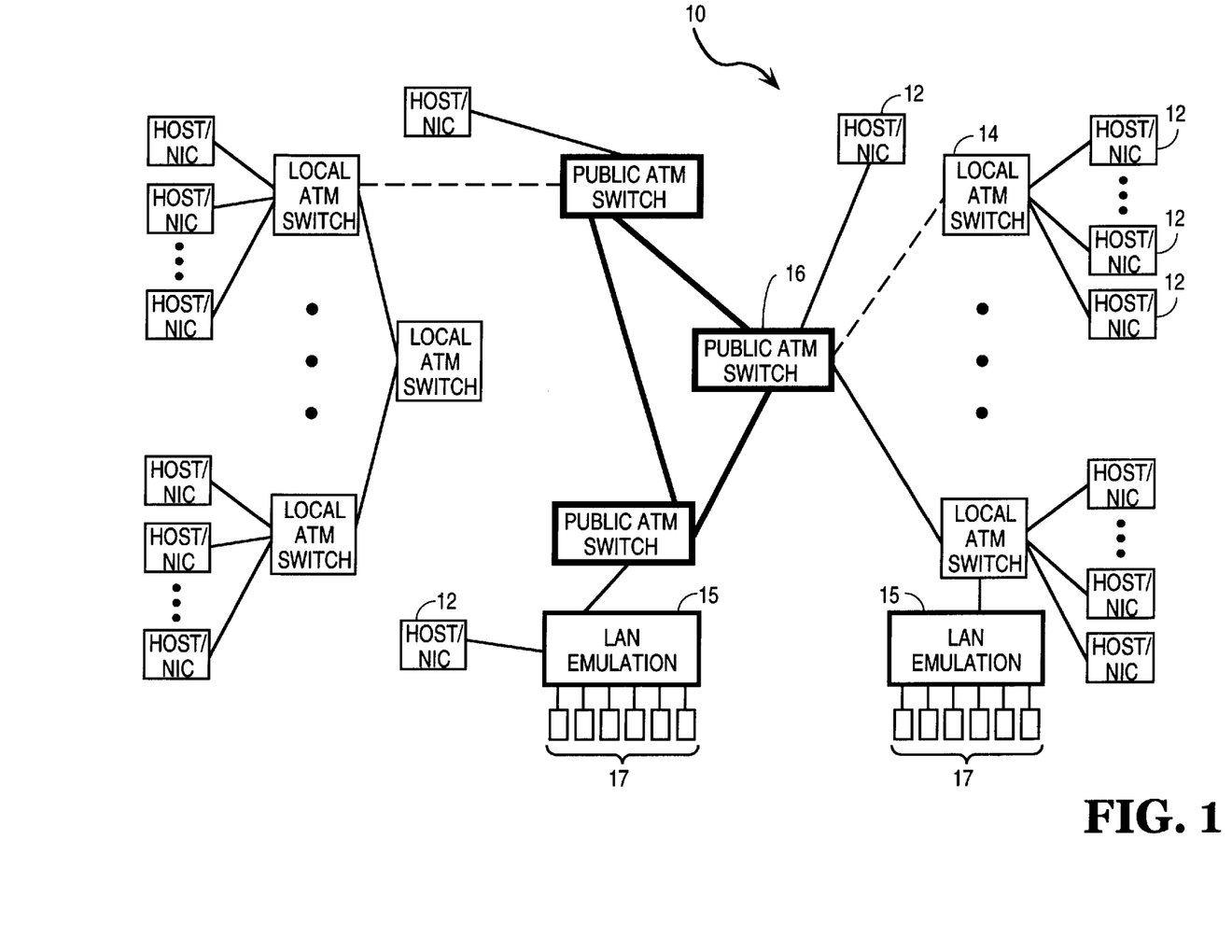
FIG. 1 is an exemplary computer network which implements an asynchronous transfer mode protocol of the transfer of information.

FIG. 1 illustrates an exemplary computer system network incorporating the ATM network interface circuit which utilizes the method and apparatus of data transfer coordination of the present invention. The computer system network 10 includes host computer systems (not shown) which incorporate one or more of the ATM network interface circuits (NIC) 12. The NICs 12 are coupled through a local ATM switch 14 to a public ATM switch 16 to enable asynchronous transfer of data between host computer systems coupled to the network 10. Alternately, the NICs 12 can be coupled directly to the public ATM switch 16. As shown in FIG. 1, the computer system network 10 may also include computer systems which incorporate the use of a Local Area Network ("LAN") emulation 15 which serves as a gateway for connecting other networks such as Ethernet or token ring networks 17 which utilize the ATM network as a supporting framework.

Figure 2:
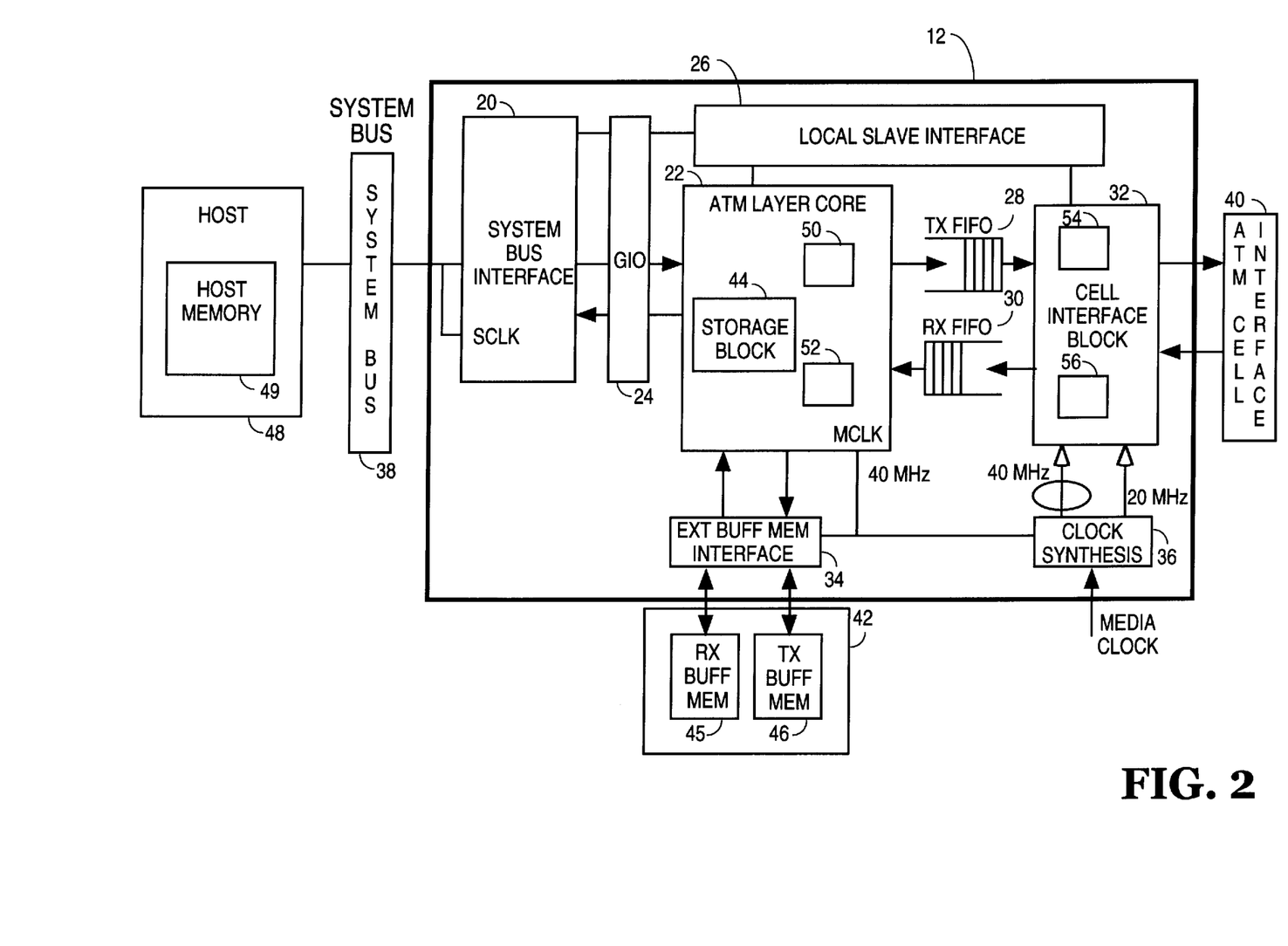
FIG. 2 is a simplified block diagram of a network interface device connected to a host computer system.

FIG. 2 is a simplified system diagram illustrating the architecture of the ATM NIC 12 which utilizes the method and apparatus of data transfer coordination in accordance with a one embodiment of the present invention. The ATM NIC 12 interfaces a host computer system 48 coupled through system bus 38 to the network ATM Cell Interface 40 operating in accordance with the ATM protocol.

The ATM NIC 12 shown includes a System Bus interface 20, a Generic Input/Output ("GIO") interface 24, an ATM Layer Core 22, a Local Slave interface 26, a transmit (TX) FIFO 28, a receive (RX) FIFO 30, a Cell Interface block 32, an External Buffer Memory Interface 34 and a clock synthesis circuit 36.

Together, the elements 20–36 of NIC 12 cooperate to transfer data between the host computer 48 and the other computers in the network through multiple, dynamically allocated channels in multiple bandwidth groups. Collectively, the elements of the network interface circuit 12 function as a multi-channel intelligent direct memory access (DMA) controller coupled to the System Bus 38 of the host computer system 48. In one embodiment, multiple transmit and receive channels are serviced as virtual connections utilizing a full duplex 155/622 Mbps (Mega bits per second) physical link. Multiple packets of data, subscribed to different channels over the System Bus 38 to the external buffer memory 42, via the External Buffer Memory Interface 34, are segmented by the System and ATM Layer Core 22 into transmit cells for transmission to the ATM Cell Interface 40 through Cell Interface block 32. The Core 22 also comprises reassembly logic to facilitate reassembly of the received cells to packets.

Three memory sub-systems are associated with the operation of the NIC 12. These include the host memory 49 located in the host computer system 48, the external buffer memory 42 external to the NIC 12 and storage block 44 located in the Core 22. The NIC 12 manages two memory areas: the external buffer memory 42 and the storage block 44. The external buffer memory 42 contains packet data for all transmit and receive channels supported by the NIC 12. The storage block 44 contains DMA state information for transmit and receive channels and pointers to data structures in host memory 49 for which DMA transfers are performed. The storage block 44 also contains the data structure specifics to manage multiple transmit and receive buffers for packets in transition between the host 48 and the ATM Cell Interface 40.

The host computer system 48 includes host memory 49 which contains data packets and pointers to the packets being transmitted and received. As noted previously, the NIC 12 also shields the cell delineation details of asynchronous transfer from the applications running on the host computer system. For present purposes, it is assumed that software running on the host computer system 48 manage transmit and receive data using wrap around transmit and receive rings with packet interfaces as is well known in the art.

The TX and RX buffers, for example, TX and RX FIFOS 28 and 30, coupled between the Core 22 and the Cell Interface block 32, are used to stage the transmit and receive cell payloads of the transmit and receive packets respectively. The Cell Interface block 32 transmits and receives cells to the ATM Cell Interface 40 of the network, driven by clock signals provided by Clock Synthesis Circuit 36. Preferably, the ATM Cell Interface 40, and therefore the Cell Interface block 32, conforms to the Universal Test and Operations Physical Interface for ATM ("UTOPIA") standard, as described by the ATM Forum specification. To conform to the UTOPIA specification, the clock synthesis circuit 36 provides either a clock signal of 20–25 MHz or 40–50 MHz to enable the Cell Interface block 32 to support an 8-bit stream at 20–25 MHz for 155 Mbps or a 16-bit stream at 40–50 MHz for a 622 Mbps data stream.

52-byte data cells each having a 4-byte cell header and a 48-byte payload are transferred from the TX FIFO 28 from TX Buffer Memory 46 via the external buffer memory interface 34 under the control of the Core 22, to the Cell Interface block 32 in groups of 4 bytes. When the Cell Interface block 32 receives the data cells through the TX FIFO 28, it inserts into each cell a header checksum as a fifth byte to the cell header prior to providing the 53-byte data cell to the ATM Cell Interface 40 at either 155 or 622 Mbps. Conversely, when the Cell Interface block 32 receives cells from the ATM Cell Interface 40, it examines the header checksum in the fifth byte of each cell to determine if the checksum is correct. If so, the byte representing the checksum is stripped from the cell and the 52-byte data cell is forwarded to the RX FIFO 30 4 bytes at a time at either 155 or 622 Mbps, otherwise the entire cell is dropped. Transferred bytes are stored in the RX Buffer Memory 45 via the external Buffer Memory Interface 34 under the control of Core 22.

In one embodiment, the TX and RX FIFOS 28 and 30, respectively, are 33 bits wide, of which 32 bits are used for transmitting data and 1 bit is used as a tag. The tag bit is used to differentiate the 4-byte cell header from the 48-byte cell payload. The tag bit is generated by a TX circuit 50 located within the Core 22. In one embodiment, the tag bit is set to 1 to indicate the start of a cell header and the tag bit is reset to 0 to indicate a cell payload. Thus, the tag bit is 1 for the first 4 bytes of the cell (header) and then the tag bit is 0 for the remaining 48 bytes of the cell (cell payload).

Upon receiving the data cells from the TX FIFO 28, a TX circuit 54 located within the Cell Interface block 32 examines the tag bit. If the tag bit is a 1, the TX circuit 54 decodes the corresponding 32 bits as the header of the cell. If the tag bit is 0, the TX circuit 54 decodes the corresponding 32 bits as data. Conversely, when the Cell Interface block 32 receives data cells from the ATM Cell Interface 40, a RX circuit 56 in the Cell Interface block 32 generates a tag bit to differentiate the 4-byte cell header from the 48-byte cell payload. The Cell Interface block 32 then dispatches the data cells in groups of 4 bytes to RX FIFO 30. Upon receipt of the cell data from the RX FIFO 30, an RX circuit 52 in the Core 22 decodes the cell data in accordance with the value of the tag bit as discussed above.

Two synchronous clocks signals, a 20 MHz signal and a 40 MHz signal, are provided to the Cell Interface block 32 from the ATM Cell Interface Clock via the Clock Synthesis circuit 36. A 40 MHz clock is supplied to provide a 16-bit data stream at 40 MHz for 622 Mbps in accordance with the specifications of UTOPIA. A divide by 2 of the 40 MHz clock signal is performed in the Clock Synthesis circuit 36 to provide an 8-bit data stream at 20 MHz for 155 Mbps in accordance with the specifications of UTOPIA. The 40 MHz clock signal is also provided to the external buffer memory interface 34 for providing a 1.2 Gbps transmission rate. In addition, the GIO 24 uses the 40 MHz clock signal for transmitting and receiving data.

The TX Buffer Memory 46 provides 32 bits of data to the TX FIFO 28 and the RX Buffer Memory 45 reads 32 bits of data from the RX FIFO 30 at every cycle of the 40 MHz clock signal. However, the ATM Cell Interface 40 reads 4 bytes of data from TX FIFO 28 every two clock cycles when operating at 622 Mbps, and reads 4 bytes of data from TX FIFO 28 every 8 clock cycles when operating at 155 Mbps. In the same manner, the Cell Interface block provides 4 bytes of data to TX FIFO 28 every two clock cycles when operating at 622 Mbps, and provides 4 bytes of data to TX FIFO 28 every 8 clock cycles when operating at 155 Mbps. Although the cell burst rate of the Core 22 is different from the cell burst rate of the Cell Interface block 32, the data rate between TX FIFO 28 and the Cell Interface block 32 is, on average, the same as the data rate between the between TX FIFO 28 and the Core 22. Similarly, the data rate between RX FIFO 30 and the Cell Interface block 32 is on average, the same as the date rate between the RX FIFO 30 and the Core 22. This is because the data rate between TX and RX FIFOS 28 and 30, respectively and the Core 22 is dependent on the rate that data is read or written by the Cell Interface block 32 respectively. In one embodiment, the depth of the TX FIFO 28 is 18 words or 1½ cells long and the depth of the RX FIFO 30 is 70 words long.

The System Bus Interface 20 and GIO interface 24 insulate the host computer system 48 from the specifics of the transfer to the ATM Cell Interface 40. Furthermore, the Core 22 is insulated from the specifics of the system bus 38 and host specifics. In the present embodiment, the System Bus is an S-Bus, as specified in the Institute of Electronics and Electrical Engineers ("IEEE") standard 1496 specification. The System Bus Interface 20 is configured to communicate in accordance with the specifications of the system bus, in the present illustration, the S-Bus. It is contemplated that the System Bus Interface 20 can be configured to conform to different host computer system busses. The System Bus Interface 20 is also configured to transfer and receive data in accordance with the protocols specified by the GIO interface 24. The GIO interface 24 provides a singular interface through which the Core 22 communicates with the host computer. Thus, the Core 22 does not change for different embodiments of the NIC 12 which interface to different host computer systems and busses.

Figure 3:
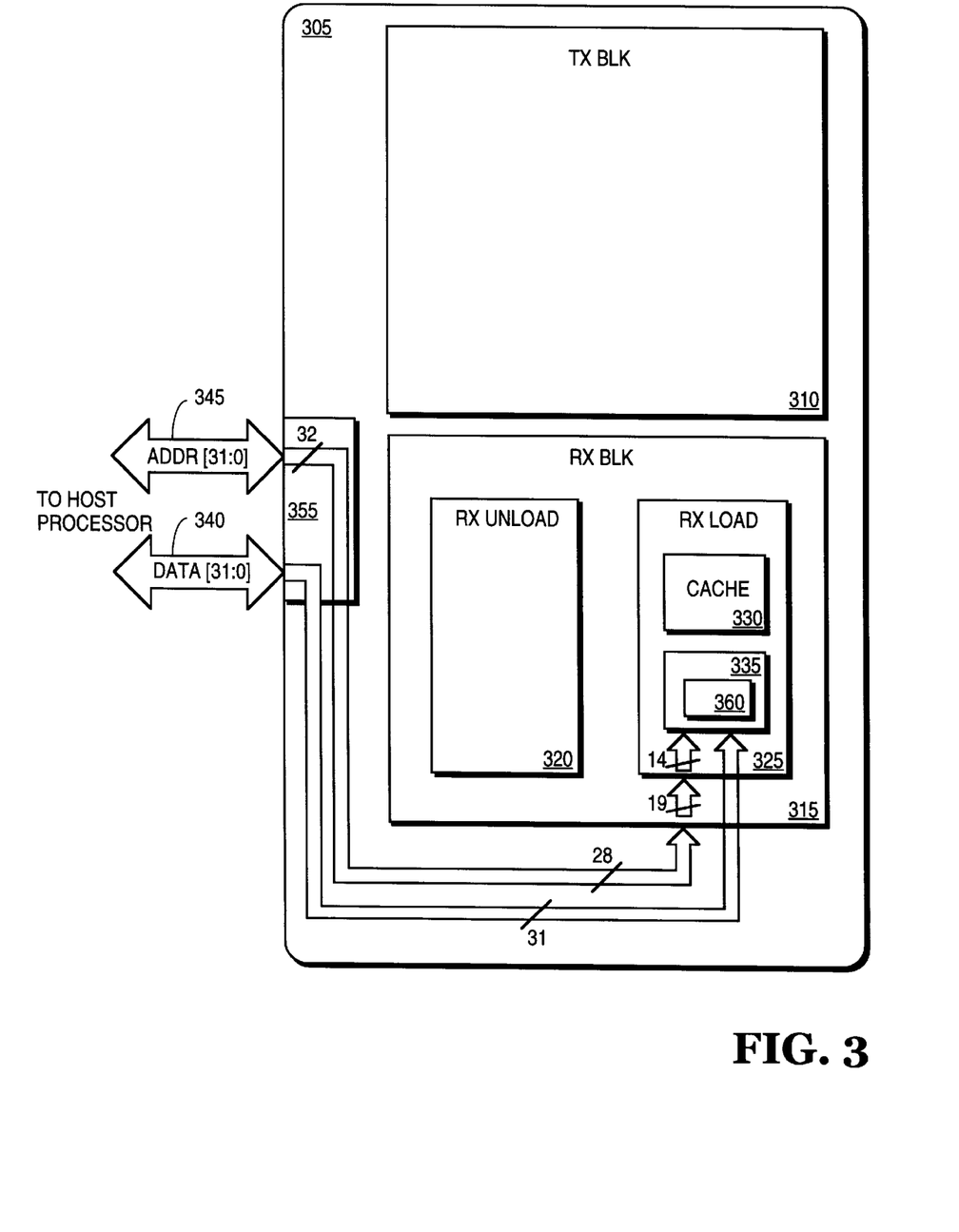
FIG. 3 is a simplified block diagram of a system core illustrating the receive blocks which operates in accordance with the teachings of the present invention.

FIG. 3 is a simplified block diagram of a portion of System and ATM Layer Core 22 showing the transmit (TX) and receive (RX) blocks 310, 315 which respectively function to transmit and receive data from the network. The present invention will be described in the context of the receive block 315; however, it is contemplated that the present invention is also applicable to the transmit block 310.

The receive block 315 includes an RX unload 320 and RX load 325 blocks. Cells containing received data from the network are stripped of the cell header, loaded into the RX load block 325, transferred to the RX unload block 320 and subsequently transferred to the host processor. The receive block 315 can support up to 1024 virtual channels, a channel being an identified connection between the host processor and a second host system coupled to the ATM network. To minimize the amount of hardware needed to support 1024 channels, virtual channel support is provided. This is transparent to the host processor. The DMA hardware used to transfer received data to the host memory functions in accordance with state information stored in a memory. The state information enables the receive block to perform transfers with respect to a particular channel. The state information can include status bits indicating physical location/codes of channels, data rates, memory locations to transfer received data to, error information and other information needed to perform transfers in accordance with system specifications and network specifications.

To the host processor, the device contains 1024 channels that are individually addressable by the host. As noted above, the RX load hardware a single set of hardware is utilized which operates in one of 1024 states corresponding to the 1024 available channels. Preferably, the states are stored in an external memory. A cache is utilized to store a subset of the different channel states, for example, the cache is large enough to store 128 states. The cache operates at sufficiently high speed to timely process data received over the high speed ATM network.

Figure 4A:
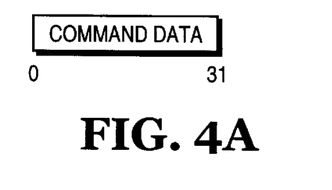
FIG. 4A illustrates information transferred over the data bus.

To minimize the risk of error, commands originating from the slower host processor are transferred atomically by utilizing both the address bus and data bus to transfer the information necessary to perform and operation relative to a particular virtual channel. In the present embodiment, the host processor knows the set of addresses that correspond to a channel. The address specifies the command to be performed and the channel the command is to be performed on. Thus the virtual channel command and the address of the channel is transmitted over the address bus and command data, which consists of the data/information needed to perform the command, is transferred over the data bus. Exemplary data transferred over the data bus is illustrated in FIG. 4A and data transferred over the address bus is illustrated in FIG. 4B.

Figure 4B:
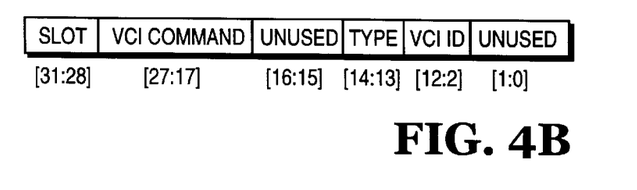
FIG. 4B illustrates information transferred over the address bus.

Referring to FIG. 4B, the channel address utilized by the host consists of the slot bus address for card on which the device is located, an address indicating that the information is directed to the VCI register (typically a device can contain many other registers that are accessible by the host processor), the type of VCI command and the identification of the channel (VCI ID). This information is transparent to the host. In the preferred embodiment, the host stores an array of addresses for each type of VCI command; therefore the host processor simply selects a particular channel addresses from the array of addresses available for a particular command to be performed.

Referring back to the embodiment represented by FIG. 3, the information transferred over the data bus 340 and address bus 345 is received by receive circuit 355 of the card. As is described below, logic at various stages decodes predetermined bits to route the data such that the type of VCI command, VCI ID and command data are stored in the VCI register for subsequent execution. Preferably, logic in the receive circuit 355 parses the slot ID from the bits received across the address bus. Logic on the card (not shown) then determines the chip on the card the information is to be forwarded to from bits 27–20 of the data received over the address bus. The remaining bits and the 32 bits received over the data bus are forwarded to the chip identified in the present example, chip 305.

Figure 4C:
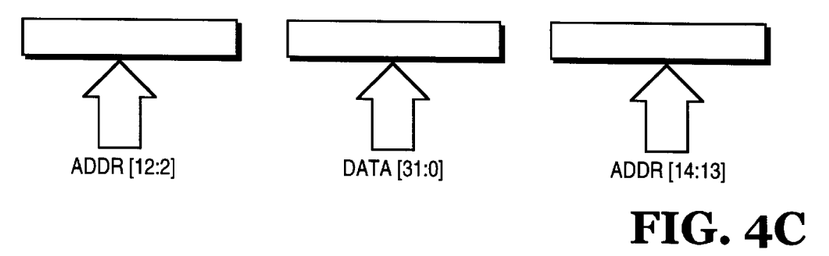
FIG. 4C is an illustration of the registers used to store the data utilized to perform a command in accordance with the teachings of the present invention.

Logic on the component 305 preferably parses bits off bits received from the address bus 345 to determine whether to transfer data to the receive block 315 or to transmit block 310. Receive block 315 includes logic to determine that the data and remaining address information is forwarded to the RX load block 325. If logic in the receive circuit determines from the VCI register address that the information is to be forwarded to the VCI register, the remaining address bits and data bits are forwarded to the VCI command logic 335 which includes VCI register 360. The VCI ID, command type and command data are stored in the VCI register 360. This is illustrated in FIG. 4C. Although the VCI register 360 illustrated in FIG. 4C is represented as three registers, it is readily apparent that the register can be implemented as one or more registers. VCI command logic processes the type of VCI command to determine that the operation is to be performed with respect to one of the virtual channels, and the RX block subsequently executes the command with respect to the identified virtual connection by first retrieving the corresponding state information from the cache 330 (FIG. 3).

Figure 6:
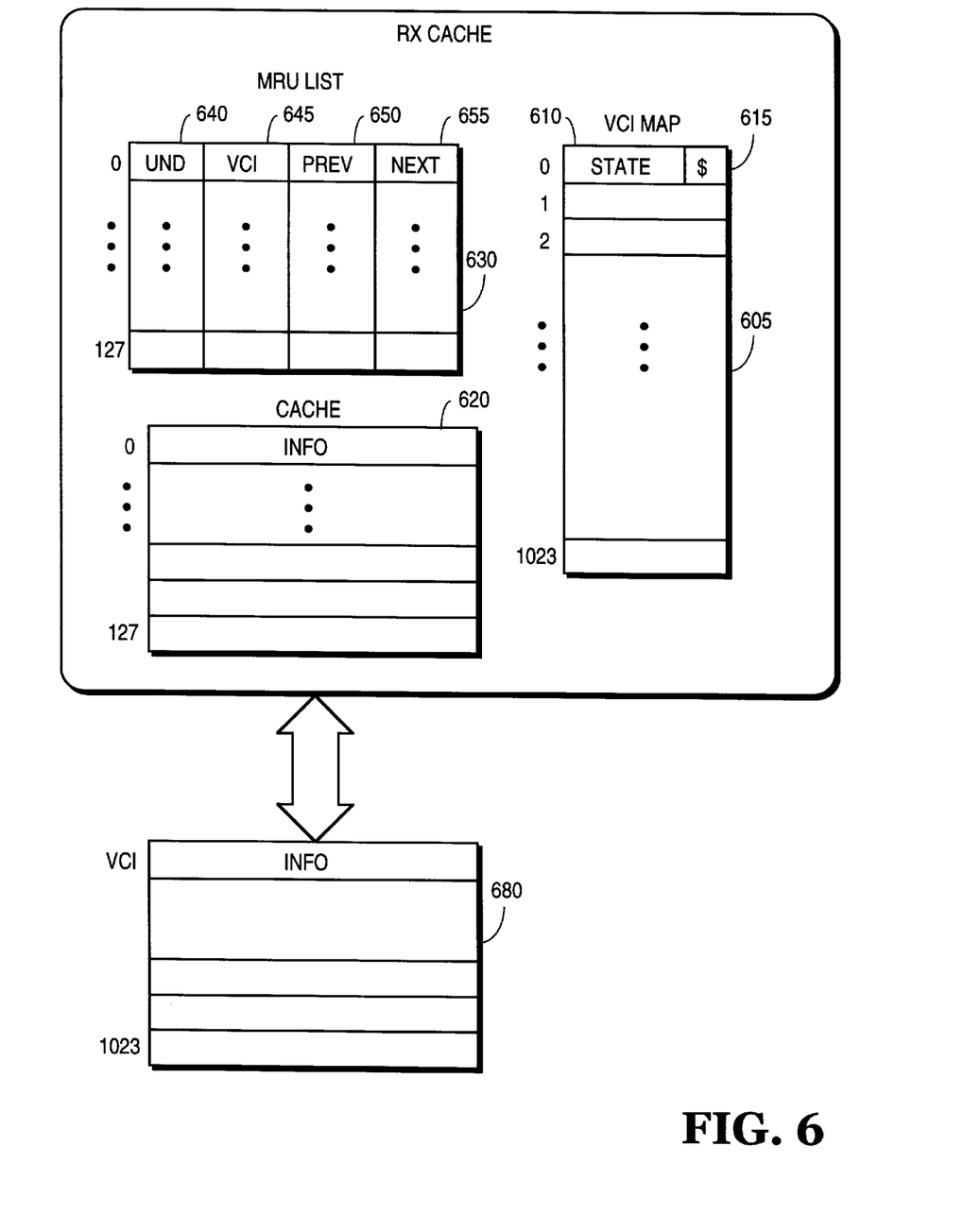
FIG. 6 is a simplified block diagram of the receive cache.

The VCI ID is used to index into a table to determine whether the information for a particular channel is currently located in the cache 330 (FIG. 3). Referring to FIG. 6, the VCI map 605 identifies whether the VCI is currently cached, item 615, and if it is cached, the location in the cache, item 610.

A most recently used (MRU), doubly linked, list 630 is preferably used to maintain pointers into the cache and determine the cache entries to remove first (i.e., the least recently accessed channel). Each entry in the MRU list preferably contains a used field 640, a VCI ID field 645, a previous pointer 650 and next pointer 655. The previous pointer 650 points to the entry next more recently used and the next pointer 655 points to the next entry lesser recently used. The cache 620 caches the information needed by the receive block to process data for the corresponding channel. When the channel information is removed from the cache 620 it is stored in slower memory 680, which provides storage of channel information for all 1024 channels.

The MRU list also contains two pointers referred to herein as MRU_first and MRU_last. The MRU_first pointer points to the most recently used entry and the MRU_last pointer points to the least recently used entry. When a new channel state needs to be brought into the cache it replaces the current least recently used entry, identified by MRU_last. Preferably MRU_last is updated during all cache operations.

The cache memory is extremely fast to accommodate the high speeds specified by the ATM protocol. Therefore it is not uncommon for the states of the entries in the cache 620 to change quickly. If the system requires multiple bus cycles to transfer the data, and the VCI command block initiates execution upon receipt of a first portion of the information during a first bus cycle and performs a lookup in the VCI Map 605 and MRU list to determine whether the channel information is cached and if cached, the location of the information in the cache 620, and by the time the remaining information has transferred, the channel information is no longer in the cache, the execution of the command will cause an error. By receiving all necessary information atomically such problems are avoided.

Figure 5:
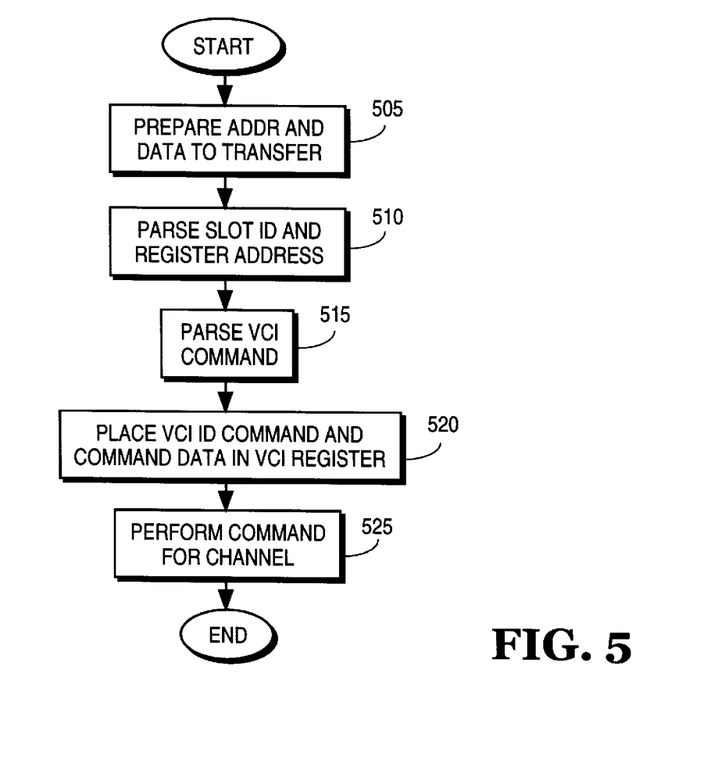
FIG. 5 is a flow chart generally illustrating the steps performed which enable the transmission of command and data to the device during one bus transmission.

The process followed to transfer the channel information to cause a command to be executed with respect to a particular virtual channel is illustrated by the flow chart of FIG. 5. At step 505, the host processor prepares the address and data to be transferred to the network interface card. Although only 128 devices are supported at any one time, the complete set of 1024 devices appear available to the host processor. As noted above, the slot address of the network interface card is first removed once the data is received in the core, step 510. The information which identifies that a VCI command and the type of command are then processed and removed from the data stream as this information is used by the logic to direct the data stream to the receive block's VCI circuit (335 FIG. 3). At step 515, the VCI ID and the command to be performed are placed in registers in the VCI circuit, step 520. The VCI circuit is then able to process the command with respect to a particular channel, step 525.

Figure 7A:
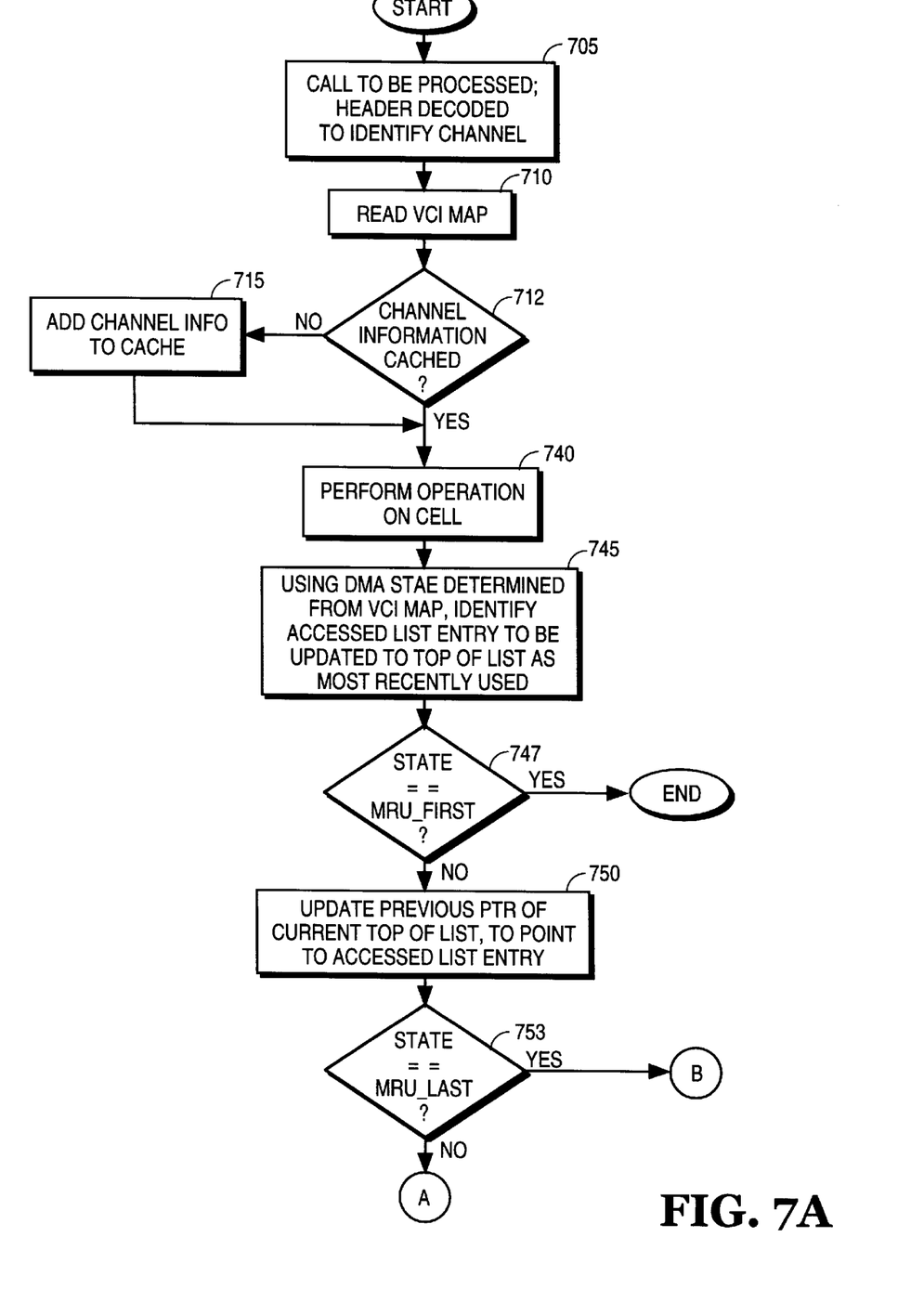
FIGS. 7A and 7B is a flow chart illustrating the process for updating the cache.

In order to increase efficiency over a random replacement algorithm, the updating of the cache is controlled by a MRU list which provides the information as to which cache entries to remove when another entry needs to be placed in the cache. The MRU list is updated in an innovative manner in order to reduce the number of clock cycles needed to update the list when an entry is accessed or removed. As shown in FIG. 7A, the MRU list is doubly linked, through a series of previous pointers 705 and next pointers 710. Updating of the cache and the supporting structure is preferably controlled by a state machine.

The speed enhancements achieved by this structure are evident for the common occurrence of a cached VCI which has just been accessed. This will be explained using the diagrams of FIGS. 8A, 8B, 8C, 8D, 8E and the flow chart of FIGS. 7A and 7B. The cache mechanism will be explained in terms of the cell receiving process and structure; however, it is readily apparent it is equally applicable to the transmit process and structure.

Figure 7B:
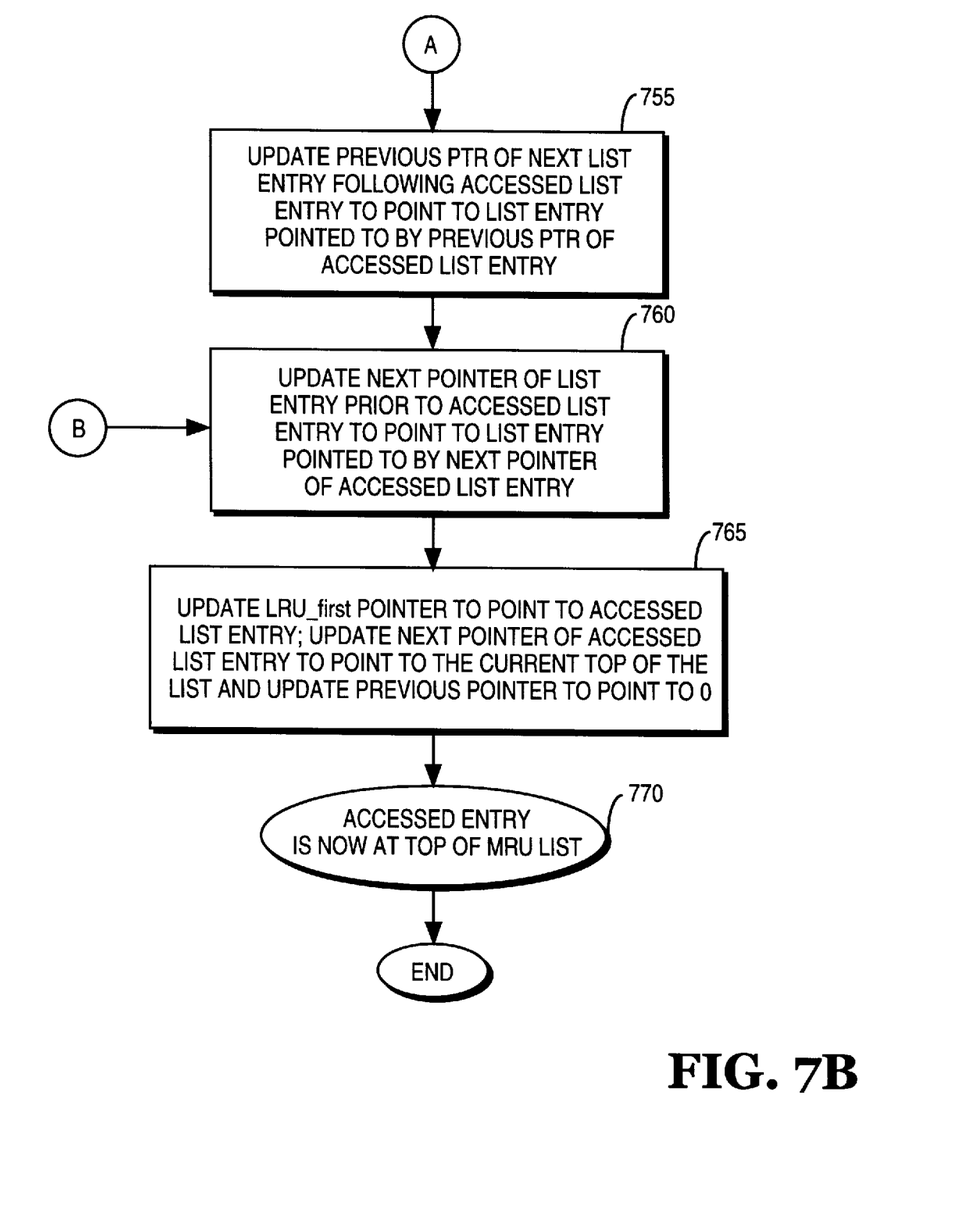

Referring to FIGS. 7A and 7B, at step 705, if a cell is to be processed, the cell header is decoded and the channel is identified by reference to the VCI Map, step 710. The DMA state identification and whether it is cached is determined from the VCI map. If the channel information is not cached, step 712, the channel information is read from memory and placed in the cache, step 715, and the operation is performed on the cell, step 740. If the channel information is already cached and is not already located at the top of the list, at step 740, the operation is first performed on the cell.

Once the operation is performed on the cell, the MRU list is updated rapidly to move the accessed entry to the top of the list in a minimum number of clock cycles. At step 745, the entry in the MRU list corresponding to the accessed channel is identified through the DMA state. Preferably, at step 747, a test is performed to determine if the entry is the first entry in the MRU list as identified by MRU_first. If it is the first entry, there is no need to update MRU list and the update process is complete. If the entry is not the first entry, the update process continues at step 750. At step 750, the previous pointer of the current top of the list is updated to point to the accessed entry.

At step 753, a test is performed to determine if the entry is pointed by the MRU_last pointer indicating that it is the least recently used entry. If the entry is not the least recently used entry, at step 755, the previous pointer of the entry pointed to by the next pointer of the accessed entry is updated to point to the entry pointed to by the previous pointer of the accessed entry.

If the entry is the least recently used entry, the process continues at step 760 in which the next pointer of the entry pointed to by the previous pointer of the accessed entry is updated to point to the entry pointed to by the next pointer of the accessed entry. The MRU pointer (MRU_first) which points to the entry at the top of the MRU list is now updated to point to the accessed entry. The next pointer of the accessed entry is also updated to point to the current top of the list and the previous pointer of the accessed entry is updated not point to anything, step 765. After these steps have been performed, the accessed entry functions as the top of the MRU list (770).

Figure 8A:
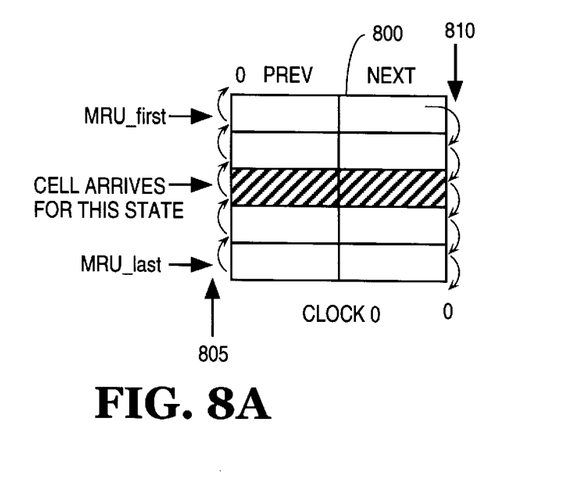
FIGS. 8A, 8B, 8C, 8D and 8E illustrate the process for updating the receive cache.
Figure 8B:
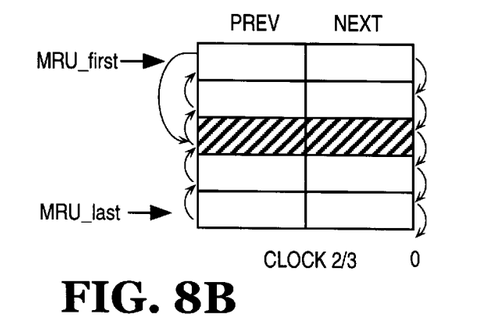
Figure 8C:
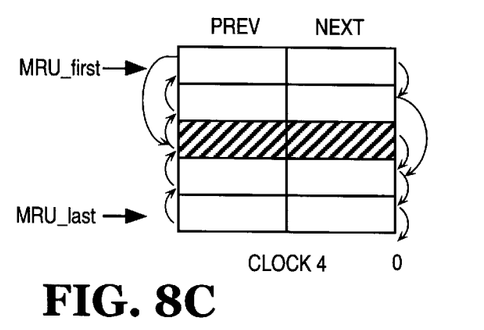
Figure 8D:
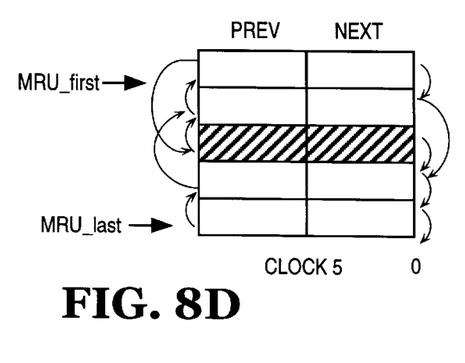
Figure 8E:
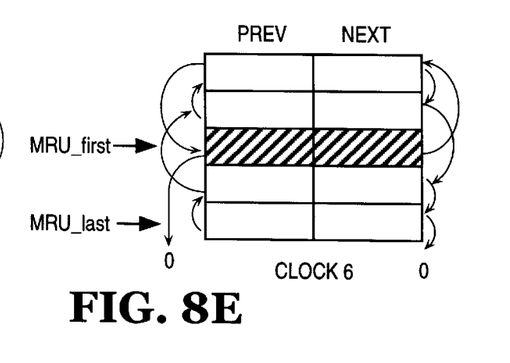
Figure 9A:
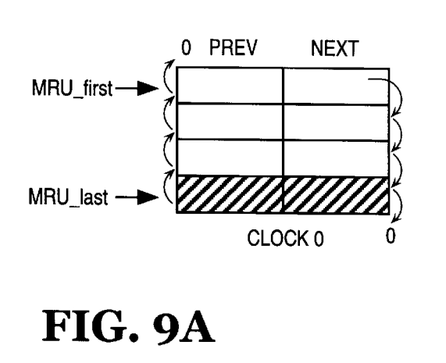
FIGS. 9A, 9B, 9C, 9D and 9E illustrate the process for updating the receive cache when the entry is the least recently used entry.
Figure 9B:
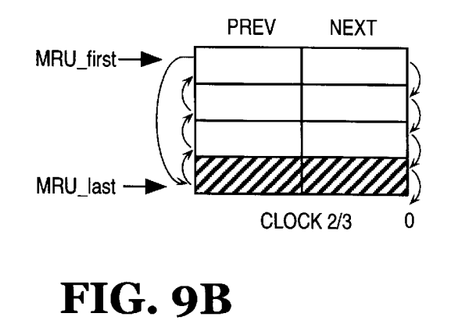
Figure 9C:
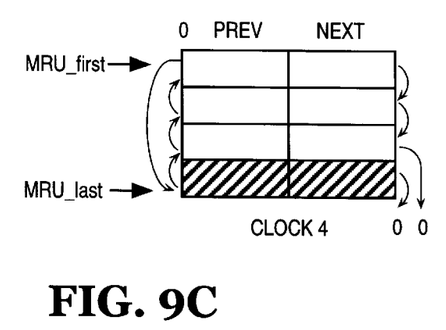
Figure 9D:
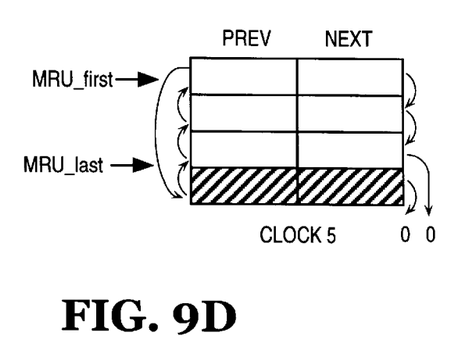
Figure 9E:
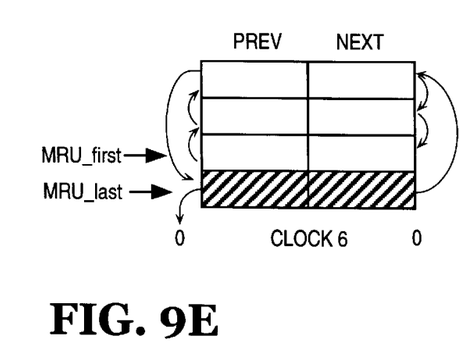

Thus significant time savings are achieved. Prior techniques could require a significant number of clock cycles just to determine the where the accessed, next and previous entries were located. Using the process and structure described herein, the MRU list is updated after 6 clock cycles. This is illustrated with respect to FIGS. 8A–8E. Referring to FIGS. 8A–8E, the first 3 clock cycles are used to perform a lookup to the VCI Map, identification of the accessed entry in MRU list and update of the previous pointer of the top entry to point to the accessed entry (FIGS. 8A, 8B). During the third clock cycle, the next pointer of the entry prior to the accessed entry is updated (FIG. 8C) and during the fourth clock cycle, the previous pointer of the entry subsequent to the accessed entry is updated (FIG. 8D). Once the above noted pointers have been updated, the last three pointers can be updated during the same clock cycle. In particular, as shown in FIG. 8E, the MRU_first pointer is updated to point to the accessed entry, and the previous and next entries of the accessed entry are updated.

For the instance when the DMA state corresponds to the least recently used entry in the list, the MRU list is updated in accordance with the steps set forth in FIGS. 9A–9E. Referring to FIGS. 9A–9E, the steps performed are cycles quite similar to those described in FIGS. 8A–8E except the MRU-last pointer is updated during the fourth clock cycle as there is no entry subsequent to the accessed entry to update.

The invention has been described in conjunction with the preferred embodiment. It is evident that numerous alternatives, modifications, variations and uses will be apparent to those skilled in the art in light of the foregoing description.

What is claimed is:

1. A network switch interface comprising:

interface circuitry for coupling data among at least one host computer and at least one of a plurality of channels of a network;

a memory coupled to the interface circuitry for storing a plurality of channel information for the plurality of channels, each channel information utilized to transfer data among the plurality of channels using at least one network switch;

a cache coupled to the interface circuitry comprising cache entries of recently used channel information;

a MRU list of the cache comprising a plurality of list entries, each list entry corresponding to a cache entry in the MRU cache;

a direct memory access (DMA) controller coupled to the interface circuitry for transferring the received data among the plurality of channels in accordance with corresponding channel information, said DMA controller accessing the cache to retrieve the corresponding channel information for the corresponding channel, if the corresponding channel information is not stored in the cache, said DMA controller accessing external memory to retrieve the corresponding channel information and store the corresponding channel information in the cache, said DMA controller further updating the MRU list to identify a current cache entry containing the corresponding channel information as most recently used.

2. The network switch interface as set forth in claim 1, wherein said DMA controller updates the MRU to identify the current cache entry as most recently used by modifying the MRU list to reflect that the current cache entry is at the top of the MRU list by updating previous pointer of a prior list entry corresponding to a prior most recently used cache entry to point to a current list entry associated with the current cache entry, updating the previous pointer of a list entry following the current list entry to point to a list entry pointed to by a previous pointer of the current list entry, updating a next pointer of a list entry prior to the current list entry to point to a list entry pointed to by a next pointer of the current list entry, and updating the previous and next pointer of the current list entry to respectively be a value indicative that the corresponding cache entry is the most recently used entry and a pointer to the prior list entry.

3. The network switch interface as set forth in claim 1, wherein said previous pointer for a most recently used list entry has a value indicative that the corresponding cache entry is the most recently used cache entry.

4. The network switch interface as set forth in claim 1, wherein said next pointer for a least recently used cache entry has a value indicative that the cache entry is the least recently used cache entry.

5. The network switch interface as set forth in claim 1, wherein said MRU list further comprises a MRU_first pointer which points to the most recently used entry.

6. The network switch interface as set forth in claim 1, wherein said MRU list further comprises a MRU_last pointer which points to the least recently used entry.

7. The network switch interface as set forth in claim 1, wherein the MRU list further comprises a MRU_last pointer which points to the least recently used entry, the current cache entry is the least recently used entry, and said DMA controller updates the MRU to identify the current cache entry as most recently used by modifying the MRU list to reflect that the current cache entry is at the top of the MRU list by updating previous pointer of a prior list entry corresponding to a prior most recently used cache entry to point to a current list entry associated with the current cache entry, updating the MRU_last pointer to point to a list entry prior to the current list entry, updating a next pointer of the list entry prior to the current list entry to point to a list entry pointed to by a next pointer of the current list entry, and updating the previous and next pointer of the current list entry to respectively be a value indicative that the corresponding cache entry is the most recently used entry and a pointer to the prior list entry.

8. The DMA system of claim 1, wherein each list entry in the MRU list comprises:

a cache pointer which points to a corresponding cache entry in the cache;

a previous pointer which points to a previous list entry corresponding to a cache entry accessed previous to the cache entry corresponding to the list entry; and a next pointer which points to a list entry corresponding to a cache entry accessed next after the corresponding cache entry.

9. The network switch interface of claim 1, wherein the network switch interface is coupled to an Asynchronous Transfer Mode (ATM) switch.

10. The network switch interface of claim 1, wherein the network switch interface is coupled through a local ATM switch to a public ATM switch to enable asynchronous transfer of data between host computer systems coupled to a network.

11. The network switch interface of claim 1, wherein at least one transmit and at least one receive channel are serviced as virtual connections of the network switch interface.

12. The network switch interface of claim 1, wherein the memory comprises a buffer memory, wherein the buffer memory comprises packet data for a plurality of transmit and receive channels of the network switch interface.

13. The network switch interface of claim 1, further comprising a storage memory, wherein the storage memory comprises DMA state information for the plurality of transmit and receive channels, wherein the storage memory comprises at least one pointer for data structures in a host memory for which DMA transfers are performed, wherein the storage memory comprises a data structure to manage at least one transmit and receive buffer for packets in transition between a host and the network switch interface.

14. A method for multiple channel direct memory access (DMA) control of a network switch interface, the method comprising the steps of:

receiving data from at least one of a plurality of channels of a network;

storing a plurality of channel information for the plurality of channels, wherein the channel information is used to transfer data among the plurality of channels of at least one network switch;

transferring the received data among the plurality of channels in accordance with corresponding channel information using a DMA controller, said DMA controller accessing a cache to retrieve the corresponding channel information for the corresponding channel, if the corresponding channel information is not stored in the cache, said DMA controller accessing an external memory to retrieve the corresponding channel information and store the corresponding channel information in the cache, said DMA controller further updating an MRU list to identify a current cache entry containing the corresponding channel information as most recently used.

15. The method of claim 14, further comprising the step of rapidly updating identification of a most recently used (MRU) cache entry, the step of rapidly updating comprising the steps of:

generating a MRU list comprising a plurality of list entries corresponding to a plurality of cache entries of recently used channel information for the plurality of network channels coupled to the at least one network switch, each entry comprising;

a cache pointer which points to a corresponding cache entry in the cache, a previous pointer which points to a previous list entry corresponding to a cache entry accessed previous to the cache entry corresponding to the list entry, a next pointer which points to a list entry corresponding to a cache entry accessed next after the corresponding cache entry;

if data from a current cache entry is accessed, updating the MRU list such the corresponding current list entry identifies the current cache entry as most recently accessed.

16. The method as set forth in claim 15, wherein said previous pointer for a most recently used list entry having a value indicative that the corresponding cache entry is the most recently used cache entry.

17. The method as set forth in claims 15, wherein said next pointer for a least recently used entry has a value indicative that the least recently used entry is the least recently used entry.

18. The method as set forth in claim 15, wherein said step of updating comprising the steps of:

updating previous pointer of a prior list entry corresponding to a prior most recently used cache entry to point to a current list entry associated with the current cache entry, updating the previous pointer of a list entry following a current list entry to point to a list entry pointed to by a previous pointer of the current list entry, updating a next pointer of a list entry prior to current list entry to point to a list entry pointed to by a next pointer of current list entry, and updating the previous and next pointer of the current list entry to respectively be a value indicative that the current cache entry is the most recently used entry and the prior list entry.

19. The method as set forth in claim 15, wherein said MRU list further includes a MRU_first pointer which points to the most recently used entry and MRU_last pointer which points to the least recently used entry and wherein the current list entry is the least recently used entry, said method for updating comprises the steps of:

updating previous pointer of a prior list entry corresponding to a prior most recently used cache entry to point to a current list entry associated with the current cache entry, updating the MU¯last pointer to point to a list entry pointed to by a previous pointer of the current list entry, updating a next pointer of a list entry prior to current list entry to point to a list entry pointed to by a next pointer of current list entry, and updating the previous and next pointer of the current list entry to respectively be a value indicative that the current cache entry is the most recently used entry and the prior list entry.

20. The method as set forth in claim 15, wherein the cache comprises cache entries of recently used channel information, said method further comprising the step of transferring data from a network to a host memory comprising the steps of:

storing in external memory a plurality of channel information for a plurality of channels, each channel information utilized to transfer data received at the host memory;

receiving data from a channel on the network;

accessing the cache to retrieve the corresponding channel information for the corresponding channel;

if the corresponding channel information is not stored in the cache, accessing external memory to retrieve the corresponding channel information and store the corresponding channel information in the cache; and transferring the received data to host memory in accordance with corresponding channel information.

\* \* \* \* \*